Aug. 14, 1956
J. P. BARKDOLL
2,758,692
CARRIAGE RETARDING DEVICE FOR TYPEWRITERS
Filed Sept. 28, 1954
3 Sheets-Sheet 3
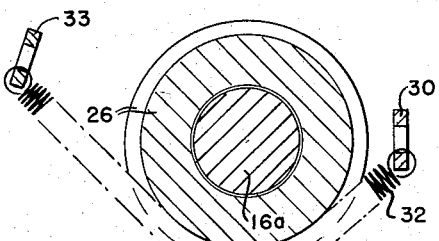
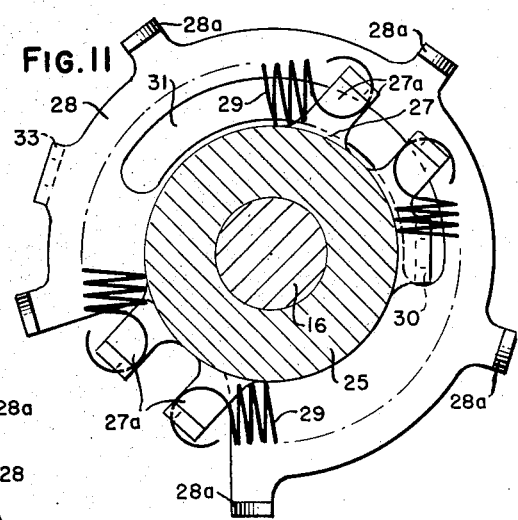
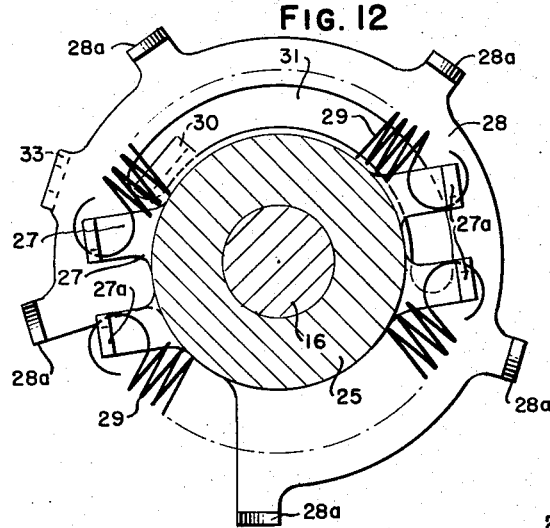
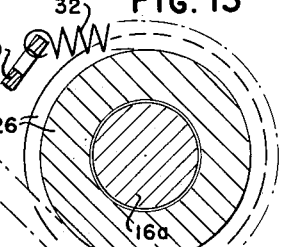
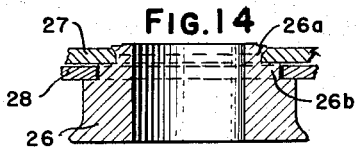
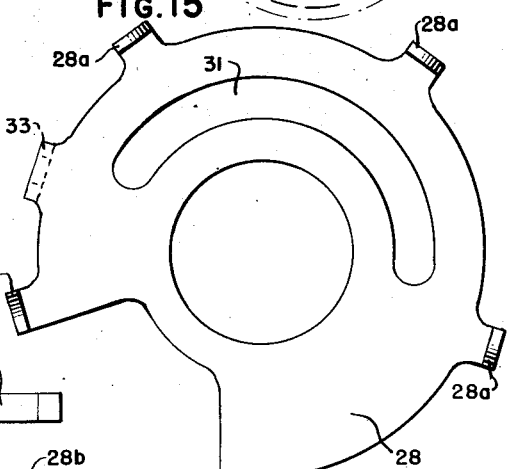
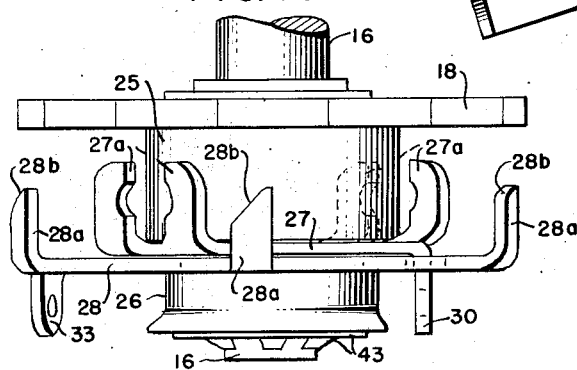
JOSEPH P. BARKDOLL
INVENTOR
BY Theodore E. Simonton
ATTORNEY United States Patent Office 2,758,692
Patented Aug. 14, 1956

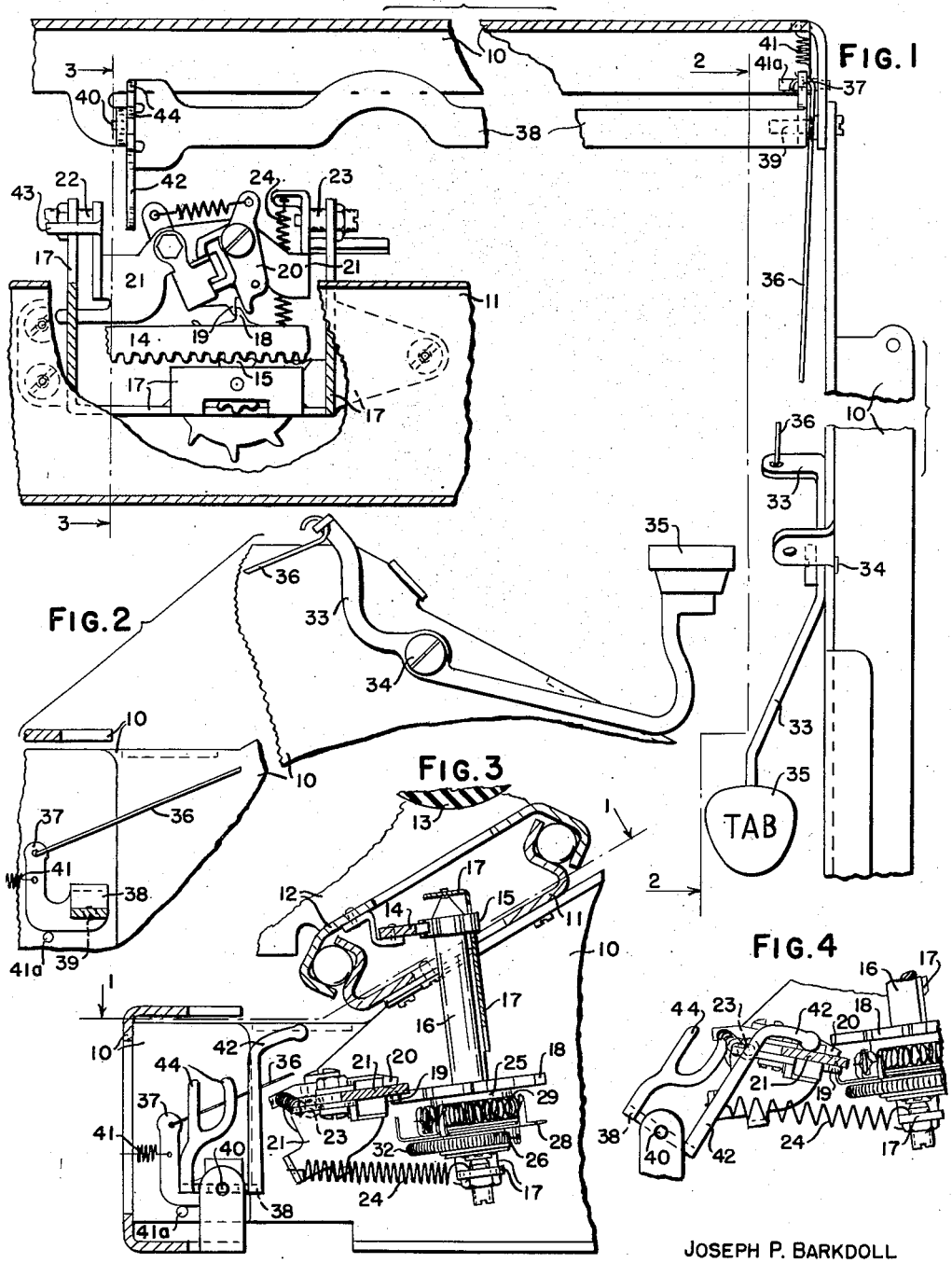
Aug. 14, 1956  J. P. BARKDOLL  2,758,692
CARRIAGE RETARDING DEVICE FOR TYPEWRITERS
Filed Sept. 28, 1954  3 Sheets-Sheet 1
JOSEPH P. BARKDOLL
INVENTOR

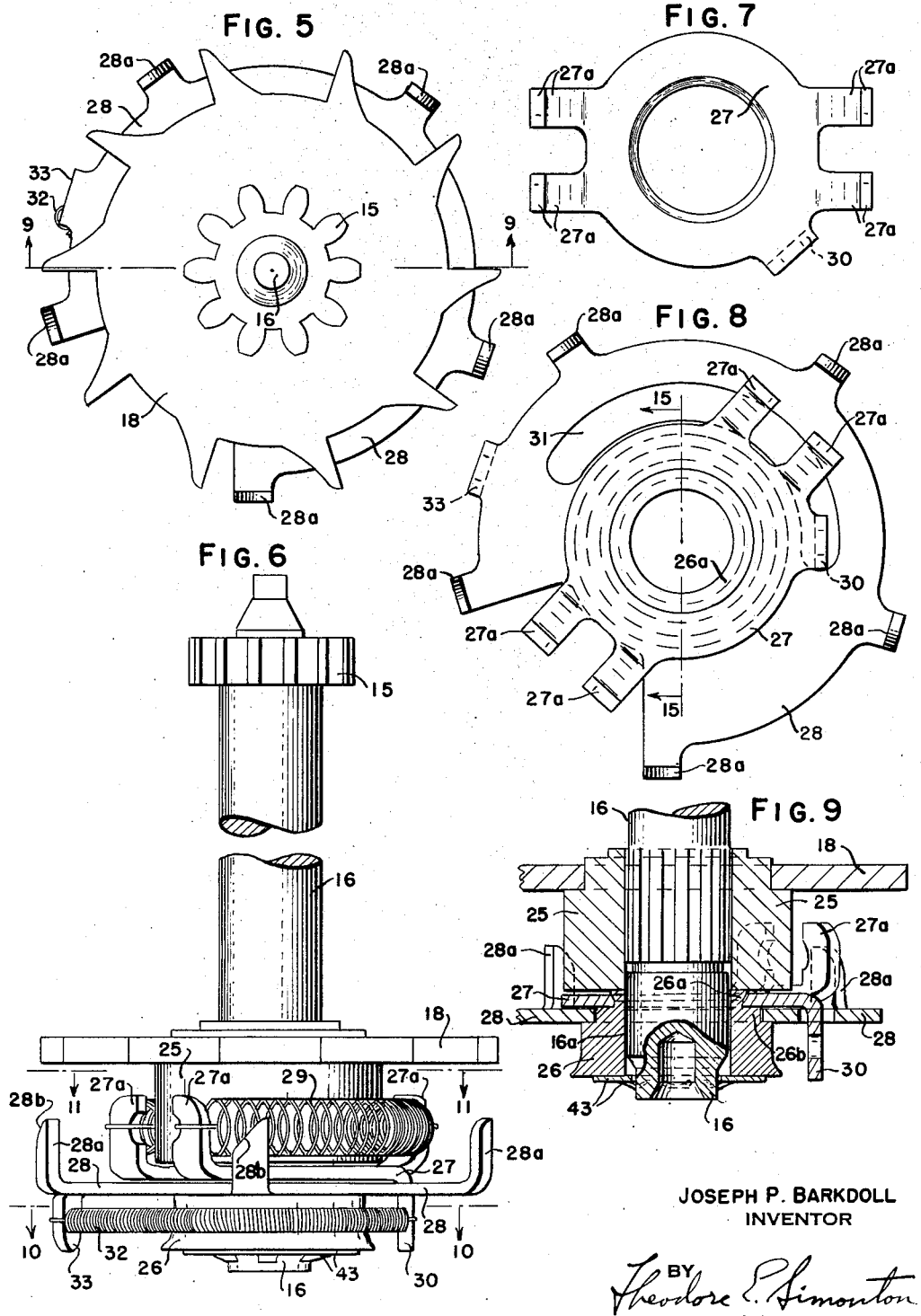

2,758,692

CARRIAGE RETARDING DEVICE FOR TYPEWRITERS

Joseph P. Barkdoll, Groton, N. Y., assignor to Smith-Corona Inc., Syracuse, N. Y., a corporation of New York Application September 28, 1954, Serial No. 458,728

14 Claims. (Cl. 197—64)

The invention relates to improvements in carriage retarding devices for typewriters, and particularly to devices for controlling the speed of carriage movement in letter feed direction during tabulating runs of the carriage.

One object of the invention is to provide a carriage retarding device of simple, compact, durable and inexpensive construction and dependable operation for frictionally retarding tabulating runs of the carriage in a manner to prevent objectionable noise and shock and rebound of the carriage upon arrest of the carriage by the tabulator stop means.

Another object of the invention is to provide an improved delayed action retarding device which becomes effective to retard tabulating runs of the carriage only after a predetermined short extent of tabulating advance of the carriage so that the device does not impede quick starting of the carriage by the usual carriage driving spring motor or prevent completion of short tabulating runs of the carriage.

Further objects of the invention are to provide a carriage retarding friction brake device in which the frictionally engaged braking elements will not be adversely affected by oil, dirt and atmospheric conditions, in which the braking elements are constantly engaged with a predetermined grip the intensity of which preferably is regulable, and in which the braking elements are compactly assembled on the shaft of a rotary carriage escapement.

Other objects and advantages of the invention will be apparent from the following description of the preferred embodiment of the invention shown in the accompanying drawings.

In the drawings:

Figure 1 is a fragmentary sectional view of a known typewriter equipped with carriage retarding means embodying the present invention, the view being taken on the line 1—1 of Figure 3;

Figure 2 is a fragmentary sectional view taken on the line 2—2 of Figure 1;

Figure 3 is a fragmentary sectional view taken on the line 3—3 of Figure 1;

Figure 4 is a view similar to Figure 3 but showing the carriage escapement released and the carriage retarding device conditioned for operation in response to depression of the tabulator key of the typewriter.

Figures 5 and 6 are end and side elevations, respectively, of the rotary carriage escapement and carriage retarding device assembly;

Figure 7 is a top plan view of the carrier for the spring brake shoes of the carriage retarding device;

Figure 8 is a top plan view of the brake assembly with all springs removed;

Figure 9 is a detail sectional view on line 9—9 of Figure 5 with the spring brake shoes omitted;

Figure 10 is a sectional view on line 10—10 of Figure 6, and Figure 11 is a sectional view on line 11—11 of Figure 6, both showing the retarding device in normal ineffective condition;

Figures 12 and 13 are views similar respectively to Figures 10 and 11 but showing the retarding device in carriage retarding condition;

Figure 14 is a detail vertical sectional view on the same line as Figure 9 showing features of the carriage retarding device assembly;

Figure 15 is a top plan view of the delayed action disk element of the retarding device; and Figure 16 is a view of the retarding device similar to Figure 6, but with all springs removed.

The improvements are shown as embodied in an otherwise known Smith-Corona portable typewriter only so much of which is shown as is necessary for a clear understanding of the present invention.

Said typewriter has a main frame 10 supporting a carriage bed 11 upon which a platen carriage 12 travels transversely of the frame, said carriage supporting a platen 13 and normally being urged toward the left by the usual spring motor, not shown.

The usual escapement mechanism is provided to feed the carriage from right to left through letter space intervals in response to actuation of type and space keys, not shown. The escapement mechanism is similar to that disclosed in my United States Patent No. 2,649,179, granted August 18, 1953. This mechanism includes a feed rack 14 fixed on the carriage, and a feed pinion 15 meshing with the rack and fixed on the upper end of an escapement shaft 16 which is journalled in a supporting bracket 17 fixed to the carriage bed. An escapement ratchet wheel 18 is mounted on shaft 16 below the feed pinion to rotate with the shaft and is rotatable step by step in carriage feeding direction under control of the holding dog 19 and stepping dog 20 carried by the dog rocker 21 which is journalled on horizontal pivots 22—23 on bracket 17 fixed to the carriage bed. A dog rocker returning spring 24 normally holds the rocker positioned as shown in Figures 1 and 3 with the holding dog 19 engaging a tooth of ratchet wheel 18 and with the stepping dog 20 located above the plane of the ratchet wheel. In normal letter feeding operations the dog rocker is rocked, by means not shown, to carry dog 19 below the wheel and carry the stepping dog 20 down into the plane of the wheel, and is then restored, to effect a cycle of one letter space feed of the carriage in a well known manner.

The improvements, which comprise an improved carriage retarding device or brake and tabulator key mechanism for releasing the carriage from control of the escapement and putting the brake into action, now will be described.

A cylindrical steel brake drum 25 is splined on shaft 16 near the lower end of said shaft to rotate with the shaft, said drum having a reduced upper end portion on which the escapement ratchet wheel 18 is fixedly held. A metal pulley 26 is rotatively journalled on a reduced and cylindrical portion 16ᵃ of shaft 16 which projects downwardly below the brake drum from within the lower portion of the drum. Pulley 26 has a reduced upper end portion 26ᵃ which abuts the lower end of brake drum 25 and which is peened to fix thereon to rotate therewith a brake shoe carrier 27. Immediately below portion 26ᵃ the pulley 26 is formed with a second cylindrical reduced portion 26ᵇ of larger diameter than portion 26ᵃ and upon which is rotatively journalled a delayed action controller 28 for the brake shoe carrier 27. The pulley and brake shoe carrier are thus rotative in unison relatively to shaft 16 and drum 25 which are held to rotate in unison, and the controller is relatively rotative to the pulley and journalled thereon.

The brake shoe carrier comprises a sheet metal disk having two diametrically opposed pairs of outwardly projecting lugs 27ᵃ having upturned outer ends. A pair of diametrically opposed helical spring brake shoes 29, each anchored at its ends to different lugs 27ª of the two pairs of lugs on the brake shoe carrier, are each bent laterally and stretched longitudinally part way about the brake drum to grip it under a constant tension which may be increased or diminished by bending the lugs of one or both pairs of lugs 27ª respectively toward or from each other.

The brake shoe carrier controller comprises a sheet metal disk formed with a peripheral series of upwardly projecting stop lugs 28ª uniformly circumferentially spaced about the escapement shaft 16 a distance equal to several tooth spaces of the escapement ratchet wheel 18, preferably a distance equal to two tooth spaces, as shown. Lugs 28ª are arranged to clear the brake shoe carrier and travel below and spaced downward from the outer end portions of the teeth of the ratchet wheel 18.

A downwardly bent lug 30 on the brake shoe carrier 27 depends through an arcuate slot 31 in the controller 28, the length of which slot is such that the carrier and controller are relatively rotative through several tooth spaces of the escapement wheel 18, preferably four such tooth spaces, as shown. A light helical spring 32 is connected to lug 30 on the carrier 27 and to a downwardly extending lug 33 on the controller 28 at points which normally are substantially diametrically opposed about pulley 26 with the lost-motion take-up spring 32 bent partly around and in contact with the periphery of the pulley to normally hold the controller rotatively advanced relatively to the carrier in the direction of letter feed rotation of escapement wheel 18 an extent limited by engagement of lug 30 on the carrier with the controller at the trailing end of slot 31 with respect to the direction of rotation of the escapement wheel during letter feed and tabulating advances of the carriage. Lug 30, slot 31 and spring 32 afford a yielding lost-motion connection between the carrier and controller.

The pulley 26, with the brake shoe carrier and controller assembled thereon, is detachably retained on shaft 16 by a metal retaining washer 43 frictionally forced on the lower extremity of the shaft.

As shown more clearly in Figures 6 and 16, lugs 28ª on the controller have their trailing edges beveled to, or substantially to, their leading edges at the upper ends of said lugs to prevent jamming of the escapement holding dog on top of any one of said lugs upon release of the escapement by the tabulating key of the typewriter, as hereinafter described.

In normal operation of the typewriter in typing, the holding dog 19 of the escapement is not rocked downward far enough to be interposed in the path of travel of lugs 28ª, so that the drum 25, the brake shoe carrier 27 and its brake shoes 29, the brake shoe carrier controller 28 and its restoring spring 32, and the pulley 26 all rotate as a unit with the escapement shaft 16 and escapement wheel 18 due to the constant grip of the spring brake shoes 29 on brake drum 25, and the engaged brake drum and brake shoes offer no resistance to letter feed or tabulating movements of the carriage until after rotation of the brake shoe carrier with the brake drum is arrested, as now will be described with reference particularly to Figures 1 to 4, in response to tabulator key depression.

A tabulator key lever 33 is fulcrumed intermediate its ends on the right hand side plate of the main frame to be rocked down and up about a horizontal pivot 34 extending transversely of the typewriter. This lever carries a tabulator key 35 on its forward arm and has its rearward arm connected by a link 36 with an upstanding arm 37 on a sheet metal rock shaft 38 which extends transversely and horizontally of the typewriter and is journalled on the main frame at 39 and 40, being normally held in the position shown in Figures 1 to 3 by suitable means, such as a return spring 41 and stop 41ª.

Substantially midway between the sides of the typewriter the rock shaft 38 is formed with an upstanding arm 42 which, upon depression of the tabulator key 35, engages the dog rocker 21 forward of the pivots of the dog rocker and rocks said rocker an abnormal extent sufficient to overthrow both the holding and stepping dogs of the escapement downwardly clear of the teeth of the escapement wheel to free the carriage from control of the escapement for a tabulating run and interpose the lowermost or holding dog 19 in the path of rotation of the stop lugs 28ª on the brake shoe carrier controller 28, as shown in Figure 4. Overthrow of the dog rocker by depression of the tabulator key is limited by engagement of a stop lug 43 (Figure 1) on the rocker with an underlying part of bracket 17.

Such overthrow of the dog rocker by depression of the tabulator key will result in the over-depressed holding dog 19 stopping rotation of the controller 28 as soon as the first one of the stop lugs 28ª advanced toward the over-depressed dog collides with the dog. This will occur, in the device shown, either immediately upon over-depression of dog 19, or upon an ensuing tabulating advance of the carriage of either one or two letter spaces.

After the controller 28 is thus arrested, the pulley 26 and the brake shoe carrier 27 and its attached spring brake shoes 29 continue to rotate as a unit with the brake drum 25 as the tabulating run of the carriage continues. This rotation stretches the light lost-motion take-up spring 32 and continues until lug 30 on the carrier is arrested by engagement with the arrested controller at the leading end of slot 31 in the controller, as shown in Figures 12 and 13, which arrest of the carrier 27 will occur, in the construction shown, only upon a tabulating run of the carriage of four letter spaces following arrest of the controller 28. Until said arrest of the brake shoe carrier by the arrested controller occurs the brake offers no resistance to the tabulating run or advance of the carriage. Thus the carriage can complete short tabulating runs of up to 4, 5 or 6 letter spaces, or corresponding initial portions of longer runs, without any resistance or retarding action by the brake.

As soon, however, as the brake shoe carrier is arrested by its controller, the carrier and its attached spring brake shoes no longer can rotate with the brake drum 25 and any additional tabulating advance of the carriage causes the brake drum 25 to rotate between, and relatively to, the drum-gripping spring brake shoes 29 which will offer a constant or uniform frictional resistance to rotation of the drum, and consequently to continued tabulating advance of the carriage, until such carriage advance is arrested by the usual tabulating stop means, not shown, of the typewriter.

Upon release of the tabulator key, after a tabulating run of the carriage has been completed, the dog rocker will return to normal position and free the controller, whereupon the light spring 32 will rotate the controller 28 in the direction of letter feed rotation of the ratchet wheel 18 and relatively to the brake shoe carrier 27 until lug 30 on the carrier again engages the controller at the trailing end of slot 31 in the controller, thereby restoring the brake to its normal ineffective condition.

The constantly engaged brake drum and brake shoes are self-cleaning and substantially entirely unaffected by dirt and oil and atmospheric conditions. Upon depression of the tabulating key they become effective to retard the carriage after a short advance of the carriage and remain effective until the tabulator key has been released and has partially returned to normal position following arrest of the carriage by the tabulator stop means. Consequently, the brake is highly effective to resist rebound of the arrested carriage. The brake is especially effective because the brake drum is substantially directly geared to the carriage. The brake mechanism is of extremely simple, compact and inexpensive construction and is very durable.

The tabulator stop means is not shown since it forms no part of the present invention. However, it may be stated that, in the typewriter shown, a fork 44 on rock shaft 38 adjacent the arm 42 is engaged with a pivoted center stop on the main frame so that said fork will rock the center stop into the path of carriage-carried tabulator stops to arrest tabulating runs of the carriage, as in the tabulating mechanism disclosed in United States patent to Avery, No. 1,992,174, granted February 26, 1935, when the tabulating key 35 is depressed.

I claim:

1. In a typewriter having a reciprocable carriage constantly urged to advance in a letter spacing and tabulating direction and an escapement mechanism for effecting letter spacing advances of the carriage, the combination of two braking elements relatively rotative about a common axis and constantly frictionally engaged to normally rotate in unison, means gearing one of said braking elements to the carriage to be rotated thereby during advance of the carriage, and tabulator key controlled means to free the carriage from the escapement mechanism for a tabulating advance and restrain rotation of the other one of said braking elements to thereby retard tabulating advance of the carriage, said braking elements comprising a brake drum and a helical spring which is supported to normally rotate with the drum with the spring laterally bent part way about the periphery of the drum under a constant longitudinal stress.

2. In a typewriter, as claimed in claim 1, means for delaying restraint of rotation of said other one of the braking elements in response to actuation of said tabulator key controlled means until the carriage has made a short tabulating advance of several letter spaces, and means for adjustably regulating the intensity of the frictional engagement of said braking elements with each other.

3. A typewriter having a carriage retarding device comprising a carriage driven brake drum rotative about a fixed axis during carriage travel, a spring carrier mounted for rotation relatively to said drum about said axis, a pair of helical springs attached at their ends to said carrier with the springs straddling the drum in frictional binding engagement with the periphery of the drum between their ends for rotation of the springs and their carrier as a unit normally with the drum, and key controlled means actuative to arrest rotation of the spring carrier to impose a carriage travel retarding frictional drag of the springs on the drum.

4. A typewriter, as claimed in claim 3, wherein the spring carrier has adjustable anchorages for the ends of the springs for regulating the frictional grip of the springs on the drum periphery.

5. A typewriter having a main frame, a reciprocable platen carriage advanceable across the main frame in a letter feeding direction in which the carriage is advanceable for tabulating, a carriage letter feeding escapement including a dog rocker rockable from and to a normal position to letter feed the carriage, a tabulator key and connections actuative to over-rock the dog rocker from its normal position to free the carriage from control of the escapement for a tabulating advance, two constantly frictionally engaged braking elements one of which is constantly geared to the carriage and supported for rotation about a fixed axis and the other one of which is supported to normally be rotated about said axis in consequence of the frictional engagement of said elements, and means including an escapement dog on said dog rocker for arresting rotation of said other one of the braking elements when the dog rocker is over-rocked by said tabulator key and connections to thereby cause said braking elements to frictionally retard tabulating advance of the carriage.

6. A typewriter having a reciprocable platen carriage advanceable in a letter spacing and tabulating direction, a rack reciprocable with said carriage, a shaft geared to said rack for rotation thereby, a brake drum element, a brake shoe carrier element, a pair of helical spring brake shoes straddling the periphery of said drum element under tension and in frictional gripping contact with the drum element periphery and each anchored at its ends to the brake shoe carrier element, said brake drum element and said brake shoe carrier element being supported for relative rotation about the axis of said shaft with one thereof constantly held to rotate with the shaft and the other one free to rotate relatively to said shaft, whereby the drum and carrier normally rotate in unison with the shaft in consequence of the frictional gripping contact of the spring brake shoes with the periphery of the drum element, an escapement ratchet wheel rotative with said shaft, a dog rocker carrying a holding dog and a stepping dog and rockable relatively to said escapement wheel through a normal range to letter space the carriage, and a tabulator key and connections for over-rocking the dog rocker to free the carriage from control of said dogs for a tabulating run and position one of said dogs to arrest rotation of said other one of the brake drum and brake shoe carrier elements to effect frictional retardation of tabulating runs of the carriage.

7. A typewriter, as claimed in claim 6, having means to delay arrest of said other one of the brake drum and brake shoe carrier elements following actuation of the tabulator key until the carriage has moved through several letter spaces of a tabulating run.

8. A typewriter, as claimed in claim 7, wherein the drum element is fixed to said shaft to rotate therewith and the brake shoe carrier element is free to rotate about said shaft.

9. In a typewriter having a platen carriage advanceable in a letter feeding and tabulating direction and an escapement for letter feeding the carriage, means for retarding tabulating advances of the carriage comprising a brake drum geared to the carriage and supported for rotation about a fixed axis by advance of the carriage, a brake shoe carrier rotative relatively to the drum about said axis, a pair of helical spring brake shoes anchored at their ends to the carrier and straddling and gripping the drum periphery under tension for normal rotation of the carrier and brake shoes with the drum, a tabulator key and connections actuative to free the carriage from letter feeding control by the escapement to permit tabulating advance of the carriage, and means responsive to freeing of the carriage by actuation of said tabulator key for arresting rotation of the brake shoe carrier.

10. In a typewriter having a platen carriage advanceable in a letter feeding and tabulating direction and an escapement for letter feeding the carriage, means for retarding tabulating advances of the carriage comprising a brake drum geared to the carriage and supported for rotation about a fixed axis by advance of the carriage, a brake shoe carrier supported for rotation relatively to the drum about the drum axis, a pair of helical spring brake shoes anchored at their ends to the carrier and straddling the periphery of the drum transversely of the drum axis in frictional gripping engagement with said drum periphery for normal rotation of the carrier and its brake shoes with the drum, a brake shoe carrier controller rotative relatively to the drum about the drum axis and having a yielding rotary lost motion connection with the carrier permitting limited rotation of the carrier with the drum following an arrest of rotation of the controller during carriage advance, a tabulator key and connections actuative to free the carriage from letter feeding control by the escapement to permit a tabulating advance of the carriage, and means whereby freeing of the carriage from control of the escapement effects arrest of rotation of the brake shoe carrier controller.

11. A typewriter, as claimed in claim 10, wherein the drum is fixed to an escapement ratchet wheel shaft geared to the carriage, the escapement comprises an escapement wheel held to said shaft and a dog rocker carrying stepping and holding dogs coactive with said wheel for letter feeding the carriage, and the dog rocker is rockable by said tabulator key and connections to free said wheel from control of both of the dogs and position one of the dogs to arrest rotation of the brake shoe carrier controller.

12. A typewriter having a platen carriage advanceable in a letter feeding and tabulating direction, a feed rack on the carriage, a feed pinion meshing with the rack, a shaft carrying said pinion and rotative thereby, a tabulator key, a letter feeding escapement for the carriage releasable by actuation of the tabulator key to free the carriage for a tabulating advance and including an escapement ratchet wheel carried by the shaft for rotation therewith, a brake drum carried by the shaft for rotation therewith, a pulley carried by the shaft for rotation relatively thereto, a brake shoe carrier fixed on the pulley to rotate therewith, brake shoe means mounted on the carrier to rotate therewith and constantly frictionally gripping the drum to normally cause the brake shoe carrier to rotate with the drum, a brake shoe carrier controller mounted on the pulley for rotation relatively thereto and to the carrier and for arrest of rotation of the controller as an incident to actuation of the tabulator key, a lost-motion connection between the carrier and controller limiting relative rotation thereof, and a lost-motion take-up helical spring passing over said pulley and connected at its ends to the carrier and controller to normally rotate the controller with the carrier with the carrier conditioned for limited rotation with the drum relatively to the controller and ensuing arrest of the carrier by the controller following an arrest of rotation of the controller with the carrier upon actuation of the tabulator key.

13. A typewriter, as claimed in claim 12, wherein the brake shoe means comprises a pair of helical springs anchored at their ends to the carrier and straddling the periphery of the brake drum between their ends.

14. A typewriter, as claimed in claim 12, wherein the escapement comprises a dog rocker carrying a holding dog and a stepping dog alternatively engageable with the escapement wheel by a normal limited rocking of the rocker to letter feed the carriage, and wherein actuation of the tabulator key rocks the dog rocker to a position in which both of said dogs are disengaged from the escapement wheel and one of the dogs is positioned to block rotation of the brake shoe carrier controller with the carrier.

References Cited in the file of this patent

UNITED STATES PATENTS

| 1,060,292 | Smith | Apr. 29, 1913 |
| 1,530,885 | Des Jardins | Mar. 24, 1925 |
| 2,129,650 | Crumrine | Sept. 13, 1928 |